Oct. 30, 1923.

A. M. Mac FARLAND 1,472,183

SOLDERING IRON

Filed Aug. 18, 1921

WITNESSES:

INVENTOR

BY

ATTORNEY

Patented Oct. 30, 1923.

1,472,183

UNITED STATES PATENT OFFICE.

ALLIS M. MACFARLAND, OF WILKINSBURG, PENNSYLVANIA, ASSIGNOR TO WESTINGHOUSE ELECTRIC & MANUFACTURING COMPANY, A CORPORATION OF PENNSYLVANIA.

SOLDERING IRON.

Application filed August 18, 1921. Serial No. 493,295.

*To all whom it may concern:*

Be it known that I, ALLIS M. MACFARLAND, a citizen of the United States, and a resident of Wilkinsburg, in the county of Allegheny and State of Pennsylvania, have invented a new and useful Improvement in Soldering Irons, of which the following is a specification.

My invention relates to electrically-heated devices and particularly to electrically-heated soldering irons and it has for its object to provide a relatively simple, inexpensive soldering iron having a removable heat cartridge and adapted to be quickly assembled and disassembled.

In practicing my invention, I provide a tubular shank having a forked end which is welded or otherwise secured to a tubular metal casing. A soldering tip is located at the other end of the casing, the soldering tip having an axial integral extension adapted to fit within an axial chamber in an insulating resistor container. The resistor container is provided with a plurality of longitudinally extending chambers within which the resistor is located. Communicating laterally-extending chambers are provided to permit of locating substantially the entire resistor beneath the outer surface of the container. Two co-operating cover members are provided, each having co-operating depressions on the inner surfaces, within which depressions suitable terminal plates are located to which the ends of the resistor and of the supply-circuit conductors may be connected. A single bolt extending through the two cover members serves to hold them in proper operative position in the forked end of the shank. A suitable handle is mounted on the shank, and a suitable flexible spring serves to prevent the breakage of the supply-circuit conductors immediately adjacent the outer end of the handle.

In the single sheet of drawings,

Figure 1 is a view, in front elevation, of a soldering iron embodying my invention, certain portions thereof being cut away;

Fig. 2 is a view, in front elevation, of the tubular shank partially finished;

Fig. 3 is a view, in front elevation, of the completed tubular shank;

Fig. 4 is a view, in front elevation, of the soldering tip;

Fig. 5 is a view, in front elevation, of the resistor container;

Fig. 6 is a top plan view of the resistor container illustrated in Fig. 5;

Fig. 7 is a view, in front elevation, of one of the cover members;

Fig. 8 is a view, in side elevation, of a cover member;

Fig. 9 is a view, in rear elevation, of a cover member;

Fig. 10 is a view, in front elevation, of a modified form of terminal block, and Fig. 11 is a view, in side elevation, of the block illustrated in Fig. 10.

A tubular metal shank 12, of suitable length and radial thickness of material, is provided, at one end, with a longitudinally extending slot or saw cut 13 and, at its other end, with a slot 14 of relatively short length extending through only one of its walls. The end having the slot 14 is provided with suitable screw threads 15. The end of the shank having the slot 13 is bent to form a member of substantially Y form, as illustrated in Fig. 3 of the drawings. A collar 16 is located on the shank 12 and is welded or otherwise secured thereto to constitute an abutment for a handle 17. The front end of the shank 12 is butt-welded to a tubular metal casing 18 which is provided, at its rear end, with an internal shoulder portion 19 for a purpose to be hereinafter set forth in detail.

A soldering tip 20, which is preferably made of copper, has a front end of any suitable or desired shape, an intermediate shoulder portion 21 of smaller diameter within which is located a tapering hole 22 and an integral axial extension 23 of relatively small diameter.

A substantially cylindrical resistor-container 24 of any suitable insulating material is provided with a plurality of longitudinally extending chambers 25 and a plurality of laterally extending chambers 26 which communicate with the outer ends of each pair of chambers 25. A plurality of laterally extending chambers 27 are provided adjacent the rear end of the container 24, the entire construction of the resistor container being such that a helically-wound resistor member 28 may be located in the chambers 25 and the communicating chambers 26 and 27. The entire resistor located within the resistor container 24 is held in position by a small positioning pin 30 that projects through the wall of the tubular casing 18 to prevent any turning movement after being placed inside of the casing. A disk 31 of suitable insulating material is located adjacent to the front end of the container to insulate the resistor 28 from the inner surface of the shoulder portion 21.

A plurality of substantially triangular insulating cover plates 32, having rounded outer surfaces 33 and substantially flat inner surfaces 34, are provided with end shoulders 35 that make an inter-fitting engagement with the shoulder portion 19 with which the member 18 is provided. The inner flat surface 34 of each of the members 32 is provided with a plurality of substantially rectangular depressions 37 within which suitable contact plates 38 may be located. A plurality of longitudinally extending grooves 39 and 40 communicate with the depressions 37 and receive the ends of the resistor member 28 and of supply-circuit conductors 41, screws 42 being provided on each of the plates 38 to suitably secure the ends of the resistor member and of the supply-circuit conductors thereto. A depression 43 is provided at the inner end of each cover plate 32 in which is a centrally located raised portion 44 to separate the ends of the resistance conductor 41. A transverse hole 45 is provided in each of the members 32 to receive a clamping bolt 47, the head and nut of which are located in recesses 46 in the respective members.

The handle 17 is held in its proper operative position on the tubular shank 12 by a nut 49.

A flexible helical spring 50 surrounds the supply-circuit conductors 41 to resiliently support the same adjacent the rear end of the shank to prevent injury to the insulation and the breaking of the conductors.

A hole 51 in the tubular casing 18 registers with the hole 22 in the shoulder portion 2, to receive a tapering pin 52 for holding the soldering tip 20 in its proper operative relation to the tubular casing.

If it should become necessary, or desirable, to disassemble the completed iron, it is only necessary to drive out the tapering pin 52, after which the soldering tip 20 may be easily withdrawn from the position illustrated in Fig. 1 of the drawings. The bolt 47 and one of the plates 32 may next be removed, after which the ends of the resistor member 28 may be disengaged from the contact plates 38 by loosening the co-operating screws 42, and the entire resistor container may then be removed from the tubular casing 18.

A new heating element, comprising the resistor container 24 and the resistor element 28, may then be inserted in the tubular casing. 18. The insulating disk 31 may then be placed against the outer end of the member 24 or, if desired, it may be placed in its proper operative position over the extension 23 of the soldering tip, after which the soldering tip may be placed in position and the tapering pin 52 again inserted. The previously removed cover plate 32 may then be placed in its proper co-operating position relatively to the other plate, after which the bolt 47 may be replaced and the nut tightened thereon to securely clamp the cover plates together and in place at the forked end of the shank.

Figs. 10 and 11 illustrate a modified form of terminal block comprising a flat plate 53 of insulating material having a transversely extending groove 54 in each face. A rectangular terminal plate 55 is secured in each of the grooves 54 by a screw 56 and is provided with a plurality of clamping screws 57 to secure the ends of the resistor 28 and the end of the supply-circuit conductor 41 thereto. A pressed-metal cover 58, of suitable form and shape and held in place by the bolt 47, may be placed at each side of the member 53 to protect it.

It may be noted that the device embodying my invention provides what may be termed an encased heating element of relatively simple form, which may be easily manufactured by molding and which is of such construction as to permit of ready removal and reinsertion. In case the resistor member 28 is destroyed or injured, a new resistor member may be easily and quickly inserted in the resistor container and the whole heating element be quickly placed in the soldering iron to permit of again using the same in actual operation.

The above-described soldering tip is quickly removable and has good heat-conducting engagement, not only with the tubular casing within which the heating element is located but also with the heating element proper by reason of its axial integral extension and its shoulder portion engaging the inner surface of the tubular casing. The above described cover plate construction provides easily removable members within which the usual terminal plates may be mounted while permitting of quick and easy assembly and disassembly of any of the parts.

While I have illustrated and described the device particularly as applied to a soldering iron, it is apparent that it may also be applied to a branding-iron or any other device of substantially similar construction and that a branding-iron tip may be employed with the device and be interchangeable with the soldering tip.

Various modifications may be made in the device embodying my invention without departing from the spirit and scope thereof, and I desire that only such limitations shall be placed thereon as are imposed by the prior art or are specifically set forth in the appended claims.

I claim as my invention:

1. An electrically heated device comprising a resistor-container having a plurality of parallel-extending longitudinal chambers therein and a plurality of laterally extending chambers at each end thereof, and a resistor located in said chambers, all of said resistors being located beneath the surface of said resistor-container.

2. An electrically heated soldering iron comprising a resistor-container substantially cylindrical in form and having a plurality of longitudinally extending chambers and a plurality of laterally extending recesses connecting the ends of adjacent chambers and a resistor located in said chambers and recesses entirely beneath the surface of said resistor-container.

3. An electrically heated soldering iron comprising a tubular forked handle member, a tubular casing secured thereto, a removable resistor-container located in said tubular casing and a removable soldering tip operatively engaging said casing and having an integral portion extending into said resistor-container for receiving heat therefrom.

4. An electrically heated soldering iron comprising a tubular shank having a forked portion, a tubular casing secured thereto, a removable resistor-container located in said tubular casing, a resistor in said container, a quickly removable soldering tip operatively engaging said casing, a tapered pin engaging said casing and said tip to maintain them in operative position relatively to each other, a pair of oppositely disposed insulating cover plates located at the forked end of said shank and a plurality of terminal plates located between said cover plates.

5. An electrically heated soldering iron comprising a tubular casing, a resistor-container and a resistor in said casing, a forked tubular shank having a relatively small peripheral abutting engagement with said casing, a quickly removable soldering tip having abutting engagement with said casing over its entire periphery and having also an integral portion extending into said resistor-container, and quickly removable means for holding said soldering tip in operative relation to said casing.

In testimony whereof, I have hereunto subscribed my name this 28th day of July, 1921.

ALLIS M. MACFARLAND.